US011288429B2

(12) United States Patent
Corliss et al.

(10) Patent No.: US 11,288,429 B2
(45) Date of Patent: *Mar. 29, 2022

(54) ELECTRICAL MASK VALIDATION

(71) Applicant: INTERNATIONAL BUSINESS MACHINES CORPORATION, Armonk, NY (US)

(72) Inventors: Daniel Corliss, Waterford, NY (US); Derren N. Dunn, Sandy Hook, CT (US); Michael A. Guillorn, Cold Springs, NY (US); Shawn P. Fetterolf, Cornwall, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,824

(22) Filed: Jan. 2, 2020

(65) Prior Publication Data

US 2020/0143098 A1 May 7, 2020

Related U.S. Application Data

(63) Continuation of application No. 15/827,618, filed on Nov. 30, 2017, now Pat. No. 10,650,111.

(51) Int. Cl.
*G06F 30/34* (2020.01)
*H01L 23/58* (2006.01)
(Continued)

(52) U.S. Cl.
CPC .............. *G06F 30/34* (2020.01); *G06F 30/36* (2020.01); *H01L 21/027* (2013.01); *H01L 23/58* (2013.01);
(Continued)

(58) Field of Classification Search
CPC .......... G06F 30/30; G06F 30/34; G06F 30/39; G06F 30/333; G06F 2115/02;
(Continued)

(56) References Cited

U.S. PATENT DOCUMENTS 6,047,068 A 4/2000 Rhelimi
7,241,538 B2 7/2007 Zhang
(Continued)

FOREIGN PATENT DOCUMENTS

CN 1932651 A 3/2007
CN 104317159 A 1/2015
(Continued)

OTHER PUBLICATIONS

Buehler et al. , Abstract for "The Use of Electrical Test Structure Arrays for Integrated Circuit Process Evaluation", Journal of the Electrochemical Society, vol. 127, No. 10, pp. 2284-2290.
(Continued)

*Primary Examiner* — Paul Dinh
(74) *Attorney, Agent, or Firm* — L. Jeffrey Kelly

(57) ABSTRACT

An embodiment of the invention may include a method for ensuring semiconductor design integrity. The method may include analyzing a photomask design for a semiconductor circuit. The photomask may include a primary electrical design necessary for the operation of the semiconductor circuit, and white space, which has no primary electrical design. The method may include inserting a secondary electrical design into the white space of the photomask design for the semiconductor circuit. The secondary electrical design may have known electrical properties for validating the semiconductor circuit design.

20 Claims, 4 Drawing Sheets

(51) Int. Cl.
*H01L 21/027* (2006.01)
*G06F 30/36* (2020.01)
*G06F 30/30* (2020.01)
*G06F 30/39* (2020.01)
*G06F 30/333* (2020.01)
*G06F 115/10* (2020.01)
*G06F 117/06* (2020.01)

(52) U.S. Cl.
CPC ............ *G06F 30/30* (2020.01); *G06F 30/333* (2020.01); *G06F 30/39* (2020.01); *G06F 2115/10* (2020.01); *G06F 2117/06* (2020.01)

(58) Field of Classification Search
CPC .. G06F 30/36; G06F 2115/10; G06F 2117/06; H01L 21/027; H01L 22/30; H01L 23/58; G03F 1/36
USPC .......................................... 716/53, 110, 136
See application file for complete search history.

(56) References Cited

U.S. PATENT DOCUMENTS

| | | | |
|---|---|---|---|
| 7,265,904 | B2 | 9/2007 | Schilling |
| 7,554,337 | B2 | 6/2009 | Tuyls |
| 7,780,893 | B2 | 8/2010 | Sreenivasan |
| 7,840,803 | B2 | 11/2010 | Srinivas |
| 7,851,110 | B2 | 12/2010 | Progler |
| 7,880,880 | B2 | 2/2011 | Van Bilsen |
| 8,351,087 | B2 | 1/2013 | Amidror |
| 8,610,454 | B2 | 12/2013 | Plusquellic |
| 10,429,743 | B2 | 10/2019 | Corliss |
| 2005/0095509 | A1 | 5/2005 | Zhang |
| 2005/0229131 | A1* | 10/2005 | Wu ........................... G03F 1/36 716/53 |
| 2006/0078807 | A1 | 4/2006 | Chen |
| 2006/0234137 | A1* | 10/2006 | Kim ........................... G03F 1/26 430/5 |
| 2006/0238270 | A1 | 10/2006 | Rostami |
| 2007/0016321 | A1 | 1/2007 | Rathei |
| 2007/0037394 | A1 | 2/2007 | Su |
| 2007/0074145 | A1 | 3/2007 | Tanaka |
| 2007/0145998 | A1* | 6/2007 | Smayling .......... H01L 21/67253 324/762.01 |
| 2007/0148794 | A1 | 6/2007 | Cha |
| 2007/0245290 | A1 | 10/2007 | Bueti |
| 2008/0003771 | A1* | 1/2008 | Sato .................... H01L 29/7842 438/411 |
| 2008/0120586 | A1 | 5/2008 | Hoerold |
| 2008/0201677 | A1 | 8/2008 | Baker |
| 2009/0024967 | A1* | 1/2009 | Su ............................. G03F 1/68 716/136 |
| 2009/0304181 | A1 | 12/2009 | Fischer |
| 2013/0214337 | A1 | 8/2013 | Kashihara |
| 2016/0012174 | A1 | 1/2016 | Shin |
| 2016/0064447 | A1 | 3/2016 | Kimura |
| 2016/0233177 | A1 | 8/2016 | Choi |
| 2017/0081756 | A1 | 3/2017 | Benvenuti |
| 2017/0212165 | A1 | 7/2017 | Bickford |
| 2018/0196463 | A1 | 7/2018 | Dusatko |
| 2019/0139841 | A1* | 5/2019 | Stamper .................. H01L 22/30 |
| 2019/0163857 | A1 | 5/2019 | Corliss |
| 2019/0346773 | A1 | 11/2019 | Corliss |

FOREIGN PATENT DOCUMENTS

| | | |
|---|---|---|
| CN | 111316174 A | 6/2020 |
| CN | 111357078 A | 6/2020 |
| GB | 2581755 A | 7/2020 |
| JP | 2007193795 A | 8/2007 |
| JP | 2008058166 A | 3/2008 |
| WO | 2019106501 A1 | 6/2019 |
| WO | 2019106502 A1 | 6/2019 |

OTHER PUBLICATIONS

International Search Report and Written Opinion, International Application No. PCT/IB2018/059222, 9 pages, dated Mar. 20, 2019.
International Search Report and Written Opinion, International Application No. PCT/IB2018/059223, 9 pages, dated Mar. 11, 2019.
Markman et al., "Security authentication with a three-dimensional optical phase code using random forest classifier", Research Article, Journal of the Optical Society of America A, Optics, Image Science and Vision, vol. 33, No. 6, Jun. 2016, pp. 1160-1165.
Muldavin, "Long-Term Strategy for DoD Trusted and Assured Microelectronics Needs" 19th Annual NDIA Systems Engineering Conference, Springfield, VA, Oct. 26, 2016, pp. 1-28.
Roy et al., "Ending Piracy of Integrated Circuits", Computer, published by the IEEE Computer Society, Oct. 2010, pp. 30-38.
Volodin et al., "A polymeric optical pattern-recognition system for security verification", Letters to Nature, vol. 383, Sep. 5, 1996, pp. 58-60.
IBM: List of IBM Patents or Patent Applications Treated as Related (Appendix P), Jan. 2, 2020, 2 pages.

* cited by examiner

ELECTRICAL MASK VALIDATION

BACKGROUND

The present invention generally relates to semiconductor mask manufacture, and particularly to electrical validation of semiconductor masks.

Semiconductor photomasks are designed to define circuit patterns for the transitions and interconnect layers. The photomask design also contains white space in between and around the circuit patterns for the transitions and interconnect layers. The greater the available white space on a photomask, the greater the possibility of additional circuit elements being added to the design by a third party.

BRIEF SUMMARY

An embodiment of the invention may include a method for ensuring semiconductor design integrity. The method may include analyzing a photomask design for a semiconductor circuit. The photomask may include a primary electrical design necessary for the operation of the semiconductor circuit, and white space, which has no primary electrical design. The method may include inserting a secondary electrical design into the white space of the photomask design for the semiconductor circuit. The secondary electrical design may have known electrical properties for validating the semiconductor circuit design. In an embodiment of the invention, the secondary electrical design may be electrically isolated from the primary electrical design. In another embodiment of the invention, the secondary electrical design may be electrically coupled to the primary electrical design. In another embodiment of the invention, the secondary electrical design may comprise covershapes.

Another embodiment of the invention may include analyzing one or more photomask designs for a plurality of semiconductor circuits. The photomask design may have a primary electrical design necessary for the operation of each one of the plurality semiconductor circuits, and white space between the designs for the plurality of semiconductor circuits. The white space may have no primary electrical design. The method may include inserting a secondary electrical design into the white space of the one or more photomask designs for the semiconductor circuits. The secondary electrical design may have known electrical properties for validating the semiconductor circuit design.

Another embodiment of the invention may include a semiconductor structure. The semiconductor structure may include a primary electrical circuit necessary for the operation of the semiconductor circuit. The semiconductor structure may include white space, which may have no primary electrical circuit. The semiconductor structure may include a secondary electrical circuit formed in the white space of the primary electrical circuit. The secondary electrical circuit may have known electrical properties for validating the semiconductor circuit design.

BRIEF DESCRIPTION OF THE DRAWINGS

The following detailed description, given by way of example and not intended to limit the invention solely thereto, will best be appreciated in conjunction with the accompanying drawings, in which.

Figure 1:
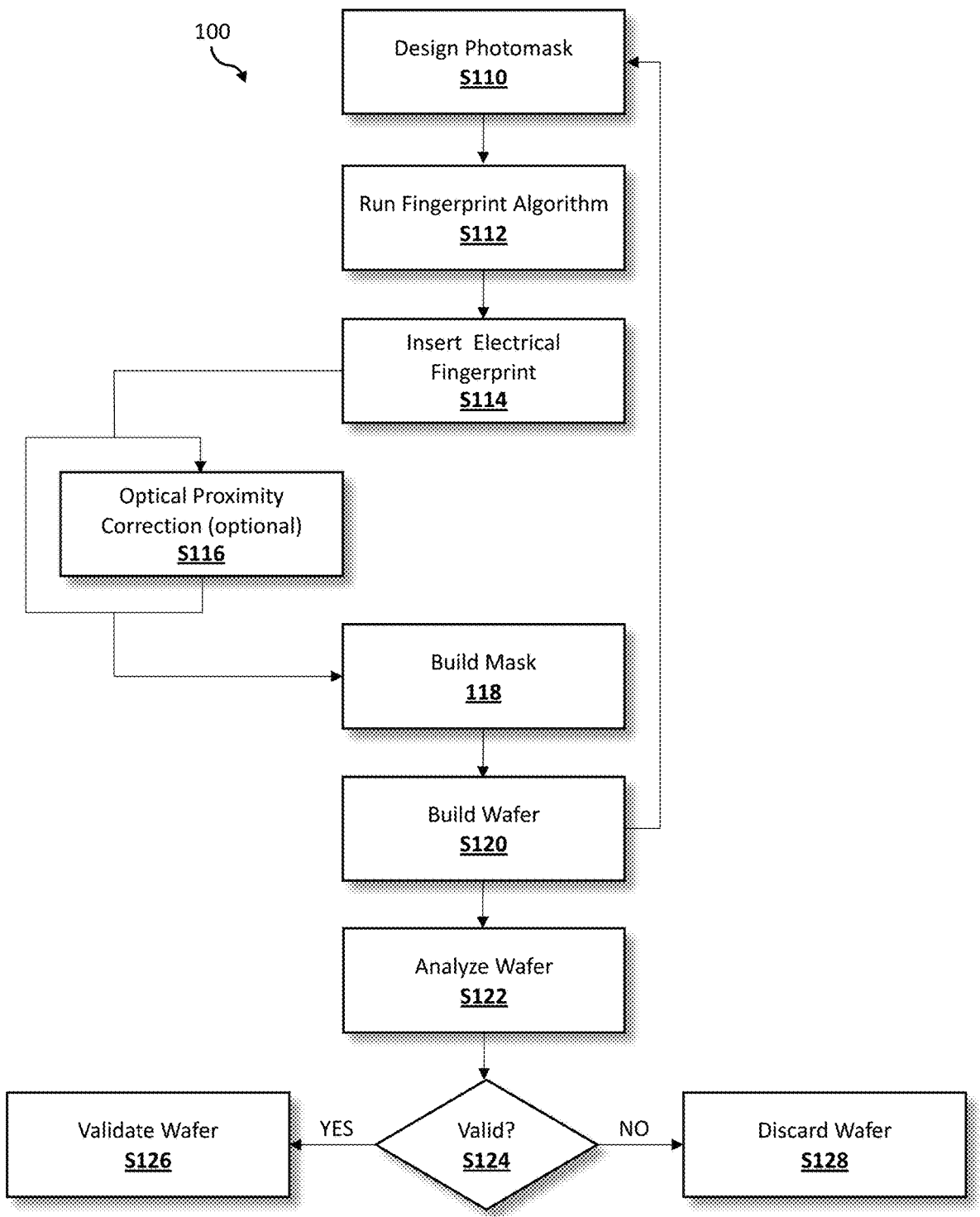
FIG. 1 is a flow chart of a method for electrically validating the correct mask was used during semiconductor manufacture, according to an embodiment of the present invention.

Elements of the figures are not necessarily to scale and are not intended to portray specific parameters of the invention. For clarity and ease of illustration, scale of elements may be exaggerated. The detailed description should be consulted for accurate dimensions. The drawings are intended to depict only typical embodiments of the invention, and therefore should not be considered as limiting the scope of the invention. In the drawings, like numbering represents like elements.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Embodiments of the invention generally relate to methods of electrically validating the usage of a photomask in semiconductor manufacture. Semiconductor photomasks define the circuit patterns for the transitions and interconnect layers. Photomasks also contains white space in between and around the circuit patterns for the transitions and interconnect layers which allow for the possibility of unwanted additional circuit elements being added by a third party. The present invention uses an algorithm to analyze the available white space on a photomask and designs a circuit pattern to be inserted on the photomask to consume the white space. The circuit pattern inserted into the white space may also have known electrical properties, such as, but not limited to, resistance, capacitance, and inductance. Thus, the present invention prevents the addition of unwanted circuit elements into the design for a semiconductor by providing an electrically testable white space circuit design.

Embodiments of the present invention will now be described in detail with reference to the accompanying Figures.

FIG. 1 is a flow chart of a method 100 for electrically validating the correct mask was used during semiconductor manufacture, according to an embodiment of the present invention. Referring to FIG. 1, the method 100 includes a step 110, designing a photomask; a step 112, running a fingerprint algorithm; a step 114, inserting an electrical fingerprint in the white space of the photomask; a step 116, enhancing the photomask using optical proximity correction; a step 118, building a mask; a step 120, building a wafer; a step 122, testing the electrical properties of the wafer; a step 124, comparing the electrical properties of the wafer to known electrical properties of the electrical fingerprint design; a step 126, validating the wafer when the electrical properties match; and a step 128, discarding the wafer when the electrical properties do not match. Steps of the method embodied in FIG. 1 are depicted in FIGS. 2a-f.

Figure 2A:
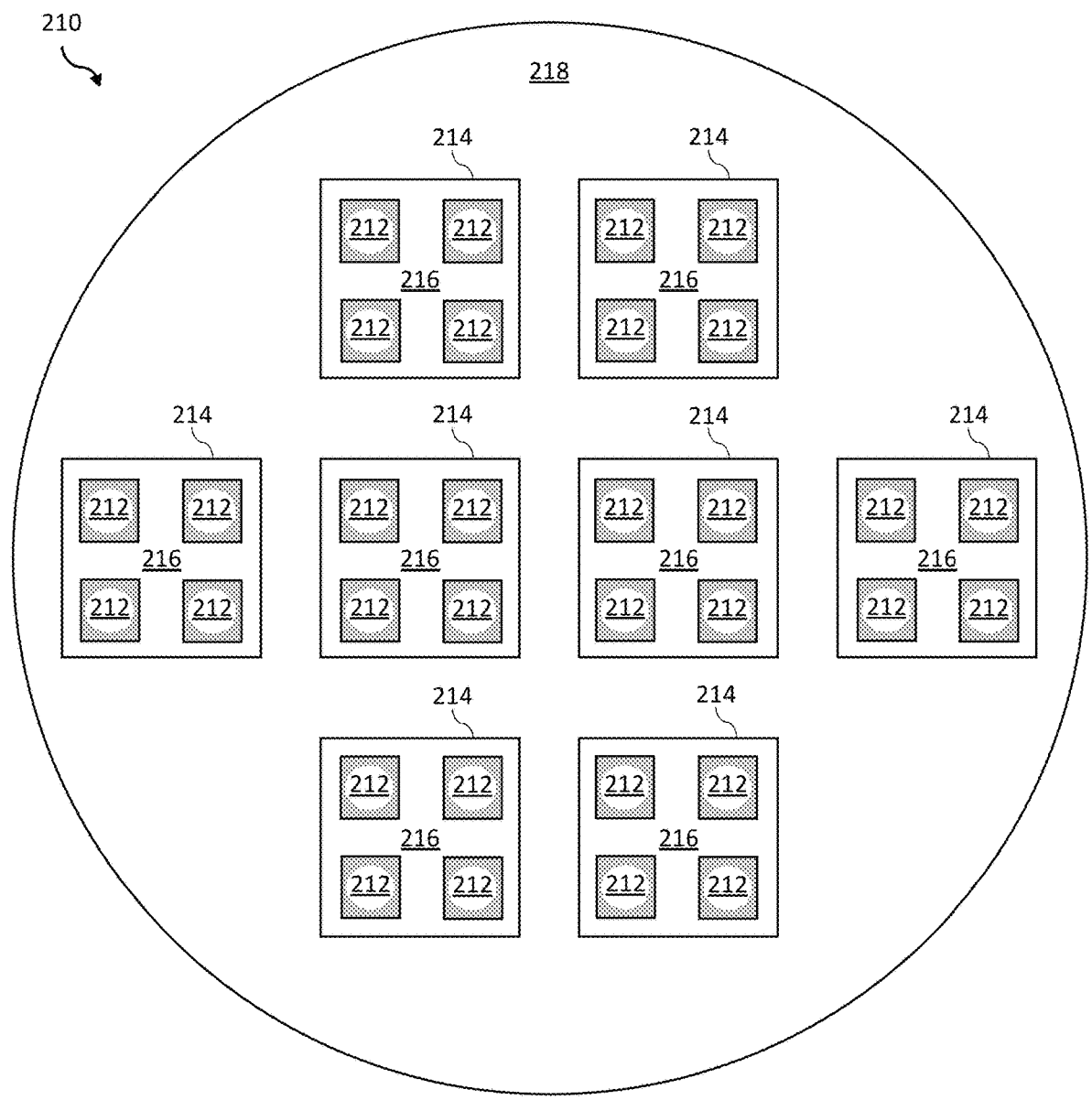
FIG. 2a is a plan view of a photomask for a semiconductor, according to an embodiment of the present invention.

Referring to step S110, described in conjunction with FIG. 2a, a photomask 210 is designed, photomask 210, defining a design for deposition layer 212 for interconnect layers in a semiconductor chip 214. Photomask 210 may contain designs for the conductive components for one of the interconnect layers of a semiconductor chip 214, i.e. a primary electrical design. The photomask design may also contain white space 216, i.e. areas of no design, in between and around the circuit designs for the transitions and interconnect layers for each semiconductor chip 214. Photomask 210 may also contain a kerf 218, i.e., white space in between the one or more semiconductor chip 214 designs where the semiconductor chips 214 of a single wafer are cut apart. It may be appreciated that each semiconductor chip 214 is designed using multiple different photomasks 210, each photomask 210 defining circuit structures in a deposition layer 212, which are layered on top of one another.

Figure 2B:
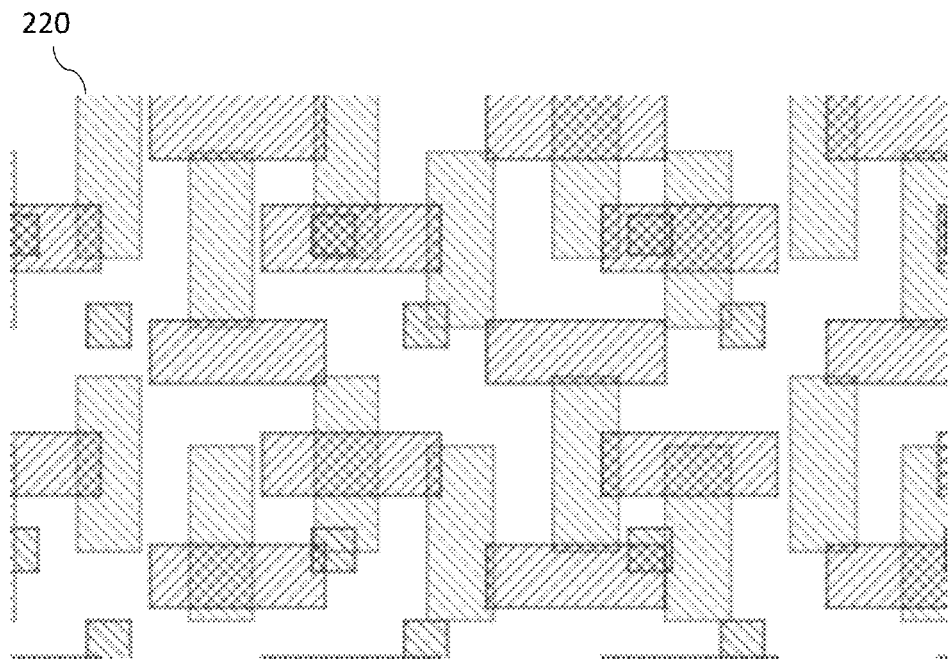
FIG. 2b illustrates an example electrical fingerprint design, according to an embodiment of the present invention.
Figure 2C:
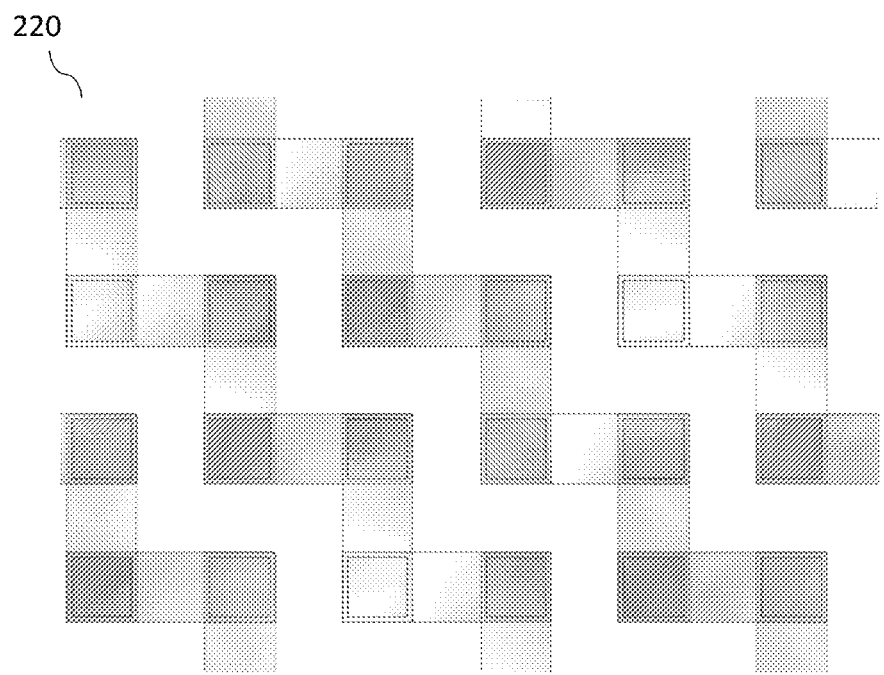
FIG. 2c illustrates an example electrical fingerprint design, according to an embodiment of the present invention.

Referring to step S112, described in conjunction with FIGS. 2b-c, a fingerprint algorithm is run to design an electrical fingerprint 220, i.e. a secondary electrical design, to fit within the available white space 216 of the design for semiconductor chips 214 on photomask 210. For example, the fingerprint algorithm may analyze the white space 216 of the design of objects to be printed, the sizes of the designed objects to be printed and the critical aspects of the designed objects to be printed for semiconductor chips 214 on photomask 210 and calculate a circuit design to fit within white space 216. The fingerprint algorithm may analyze all of photomasks 210 that will be used to manufacture semiconductor chip 214 to create electrical fingerprint 220. The fingerprint algorithm may account for the overlay and placement of the generated fill structures of the circuit design of electrical fingerprint 220 between layers of electrical fingerprint 220 to ensure that they are able to be tested and/or visually assessed during and post-manufacturing for validity against the inserted fill. For example, electrical fingerprint 220 as illustrated in FIGS. 2b-c shows a fingerprint design for multiple photomasks 210 layered on top of one another, i.e. designs for subsequent deposition layers 212. In an embodiment of the invention, the fingerprint algorithm may intentionally omit certain overlay/contact points between layers in electrical fingerprint 220. For example, the fingerprint algorithm may use, but is not limited to, a covershape approach to determine the regularity and placement of intentionally omitted shapes within the circuit design of electrical fingerprint 220. The covershape definitions may be restricted to the fill definition and fingerprint algorithm and may not be shared with the subsequent manufacturing steps, and thus remain protected which may allow the unique covershape designs to be electrically recognized.

Electrical fingerprint 220 may be a design for conductive interconnects which have a known electrical property such as, but not limited to, resistance, capacitance, and inductance. The design of electrical fingerprint 220 may be coupled to the functional operation of semiconductor chip 214. For example, electrical fingerprint 220 may be necessary for semiconductor chip 214 to operate. In an embodiment of the invention, electrical fingerprint 220 may be separate, i.e. isolated, from the functional operation of the semiconductor. In another embodiment of the invention, electrical fingerprint 220 may also be designed to fit within kerf 218 between semiconductor chips 214.

Figure 2D:
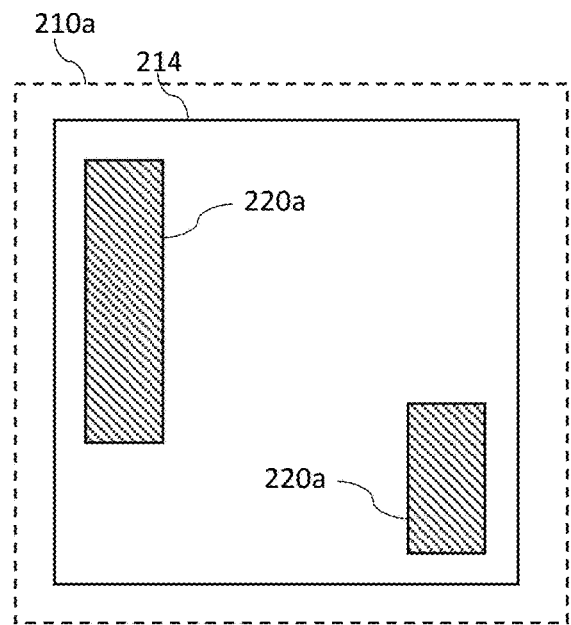
FIG. 2d is plan view of a semiconductor design for a first deposition layer with an electrical fingerprint, according to an embodiment of the present invention.
Figure 2E:
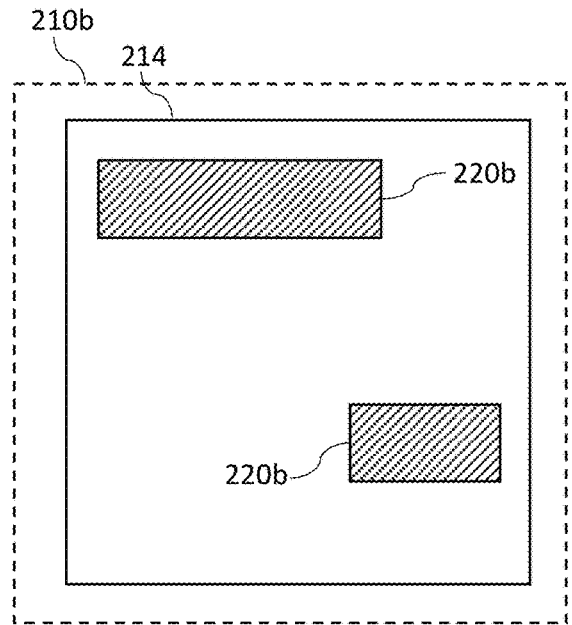
FIG. 2e is plan view of a semiconductor design for a second deposition layer with an electrical fingerprint, according to an embodiment of the present invention.
Figure 2F:
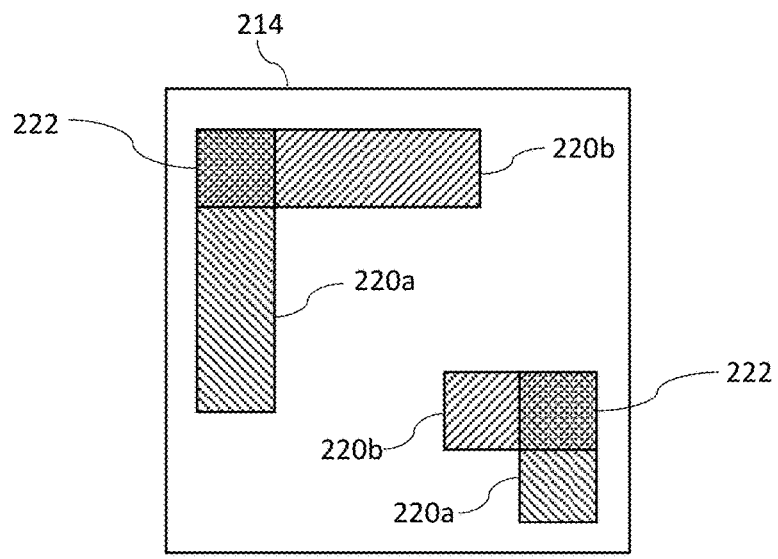
FIG. 2f is plan view of a semiconductor design for a first and second deposition layer with an electrical fingerprint, according to an embodiment of the present invention.

Referring to step S114, described in conjunction with FIGS. 2d-f, the electrical fingerprint 220 is inserted in white space 216 of the photomask design. FIG. 2d illustrates a first photomask 210a corresponding to a first deposition layer 212 of semiconductor chip 214 with a first electrical fingerprint 220a. FIG. 2e illustrates a second photomask 210b corresponding to a second deposition layer 212 of semiconductor chip 214 with a second electrical fingerprint 220b. FIG. 2f illustrates semiconductor chip 214 with the designs for first deposition layer 212 with electrical fingerprint 220a and second deposition layer 212 with electrical fingerprint 220b with overlap area 222. It can be appreciated that semiconductor chip 214 may consist of many deposition layers 212 with each deposition layer 212 having a unique design and electrical fingerprint 220. Further, it can be appreciated that semiconductor chip 214 with deposition layers 212x with electrical fingerprint 220 may have multiple overlap areas 222. Overlap areas 222 may have a known electrical property such as, but not limited to, resistance, capacitance, and inductance.

Referring to step S116, the photomask design containing the semiconductor circuit design and the electrical fingerprint design may be optionally enhanced using optical proximity correction. Optical proximity correction is a photolithography enhancement technique used to compensate for image errors due to diffraction or process effects.

Referring to step S118, photomask 210 is built according to the photomask design to include electrical fingerprint 220, and a wafer is fabricated using photomask 210 at step S120. The conductive interconnects of electrical fingerprint 220 may be, for example, a line, via, or wire found in a typical interconnect structure. The conductive interconnects may contain a liner and a metal fill. The liner may be made of, for example, tantalum or tantalum nitride, and may include one or more layers of liner material. The metal fill may include, for example, copper, aluminum, or tungsten. The conductive interconnect material may be formed using a filling technique such as electroplating, electroless plating, chemical vapor deposition, physical vapor deposition or a combination of methods. The conductive interconnect material may further include a dopant, such as, for example, manganese, magnesium, copper, aluminum, or other known dopants. In an embodiment of the invention, steps S110-S120 may be repeated until all deposition layers 212x of semiconductor chip 214 are completed.

Referring to step S122, the wafer is electrically analyzed to confirm the correct photomask design was used. For example, the electrical fingerprint 220 design may include, but is not limited to, a design resistance, a design capacitance, or a design inductance based on values calculated by the fingerprint algorithm. The wafer may be analyzed using electrical probes placed in kerf 218 of semiconductor chip 214 or within the fill region of semiconductor chip 214. The wafer may be electrically analyzed after each deposition layer 212 has been deposited. In an embodiment of the invention, the wafer may be analyzed after two or more deposition layers 212x of semiconductor chip 214 have been deposited.

Referring to step S124, the electrical properties of the wafer are compared to the known electrical properties of the electrical fingerprint 220. When the electrical properties of the wafer match the known electrical properties of the electrical fingerprint 220, the wafer is validated at step S126. When the electrical properties of the wafer do not match the known electrical properties of the electrical fingerprint 220, the wafer is discarded at step S128. In an embodiment of the invention, the wafer may be compared to known covershape designs.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein. It is therefore intended that the present invention not be limited to the exact forms and details described and illustrated but fall within the scope of the appended claims.

What is claimed is:

1. A method for ensuring semiconductor design integrity, the method comprising:
    analyzing one or more deposition layer designs for one or more semiconductor chips, the deposition layer design having one or more circuit designs for one or more semiconductor chips and a kerf between the one or more circuit designs for the one or more semiconductor chips, the one or more circuit designs for the one or more semiconductor chips having a primary electrical design necessary for the operation of the one or more semiconductor chips, and white space within the primary electrical design, wherein the white space has no primary electrical design; and
    inserting a secondary electrical circuit design into the white space of the one or more circuit designs for the one or more semiconductor chips, wherein the secondary electrical circuit design has one or more known testable electrical properties for validating the one or more semiconductor chips.

2. The method as in claim 1, wherein inserting a secondary electrical circuit design into the white space of the one or more circuit designs for the one or more semiconductor chips, further comprises:
    inserting a different secondary electrical design into the white space of each of the one or more deposition layer designs, wherein each different secondary electrical design has one or more different known testable electrical properties for validating the one or more semiconductor chips.

3. The method as in claim 1, further comprising:
    building the one or more semiconductor chips according to the one or more deposition layer designs, the one or more semiconductor chips having a primary electrical circuit and a secondary electrical circuit;
    analyzing the one or more semiconductor chips for the one or more known electrical properties of the secondary electrical circuit;
    comparing the electrical properties of the secondary electrical circuit of the one or more semiconductor chips to the one or more known electrical properties of the secondary electrical circuit; and
    validating the one or more semiconductor chips when the secondary electrical circuit and the one or more known electrical properties of the secondary electrical circuit match.

4. The method as in claim 2, further comprising:
    building the one or more semiconductor chips according to the one or more deposition layer designs, the one or more semiconductor chips having a primary electrical circuit and one or more different secondary electrical circuits;
    analyzing the one or more semiconductor chips for the one or more known electrical properties of the different secondary electrical circuits at each deposition layer;
    comparing the electrical properties of each of the different secondary electrical circuits of the one or more semiconductor chips to the one or more known electrical properties of each of the different secondary electrical circuits; and
    validating the one or more semiconductor chips when each of the different secondary electrical circuits and the one or more known electrical properties of each of the different secondary electrical circuit match.

5. The method as in claim 3, further comprising:
    discarding the one or more semiconductor chips when the secondary electrical circuit and the one or more known electrical properties of the secondary electrical circuit do not match.

6. The method as in claim 4, further comprising:
    discarding the one or more semiconductor chips when one or more of the different secondary electrical circuits and the one or more known electrical properties of the different secondary electrical circuits do not match.

7. The method as in claim 1, wherein the one or more known electrical properties of the secondary circuit design is of at least one of the group consisting of: a design resistance, a design capacitance, and a design inductance.

8. The method as in claim 1, wherein the secondary electrical design is electrically isolated from the primary electrical design.

9. The method as in claim 1, wherein the secondary electrical design is electrically coupled to the primary electrical design.

10. The method as in claim 1, further comprising:
    enhancing the one or more deposition layer designs using optical proximity correction.

11. A semiconductor structure comprising:
a primary electrical circuit necessary for the operation of the semiconductor structure, and white space within the primary electrical circuit, wherein the white space has no primary electrical circuit; and
a secondary electrical circuit formed in the white space of the primary electrical circuit, wherein the secondary electrical circuit has one or more known electrical properties for validating the semiconductor structure.

12. The semiconductor structure of claim 11, wherein the secondary electrical circuit has interconnects between at least two deposition layers of the semiconductor structure.

13. The semiconductor structure of claim 11, wherein the secondary electrical circuit is electrically coupled to the primary electrical circuit.

14. The semiconductor structure of claim 11, wherein the secondary electrical circuit is electrically isolated from the primary electrical circuit.

15. The semiconductor structure of claim 11, wherein the one or more known electrical properties of the secondary circuit is of at least one of the group consisting of: a design resistance, a design capacitance, and a design inductance.

16. A semiconductor structure comprising:
one or more deposition layers;
a primary electrical circuit necessary for the operation of the semiconductor structure, and white space within the primary electrical circuit, wherein the white space has no primary electrical circuit; and
a plurality of secondary electrical circuits formed in the white space of the primary electrical circuit, wherein the secondary electrical circuit has one or more known electrical properties for validating the semiconductor structure.

17. The structure of claim 16, wherein the plurality of secondary electrical circuits further comprises:
a secondary electrical circuit formed on each of the one or more deposition layers of the semiconductor structure, each of the one or more deposition layers of the semiconductor structure containing a different secondary electrical circuit with one or more different known electrical properties for validating the semiconductor circuit design.

18. The structure of claim 17, wherein each of the different secondary electrical circuits are electrically coupled to the primary electrical circuit.

19. The structure of claim 17, wherein each of the different secondary electrical circuits are electrically isolated from the primary electrical circuit.

20. The structure of claim 16, wherein the one or more known electrical properties of the secondary circuit is of at least one of the group consisting of: a design resistance, a design capacitance, and a design inductance.

* * * * *